July 9, 1968 K. E. PERRY 3,392,378
UNDERWATER TELEMETERING APPARATUS AND THE LIKE ADAPTED FOR USE
WITH A PLURALITY OF MEASURING STATIONS Filed Oct. 26, 1964 5 Sheets-Sheet 1

INVENTOR
KENNETH E. PERRY

BY Rines and Rines

ATTORNEYS

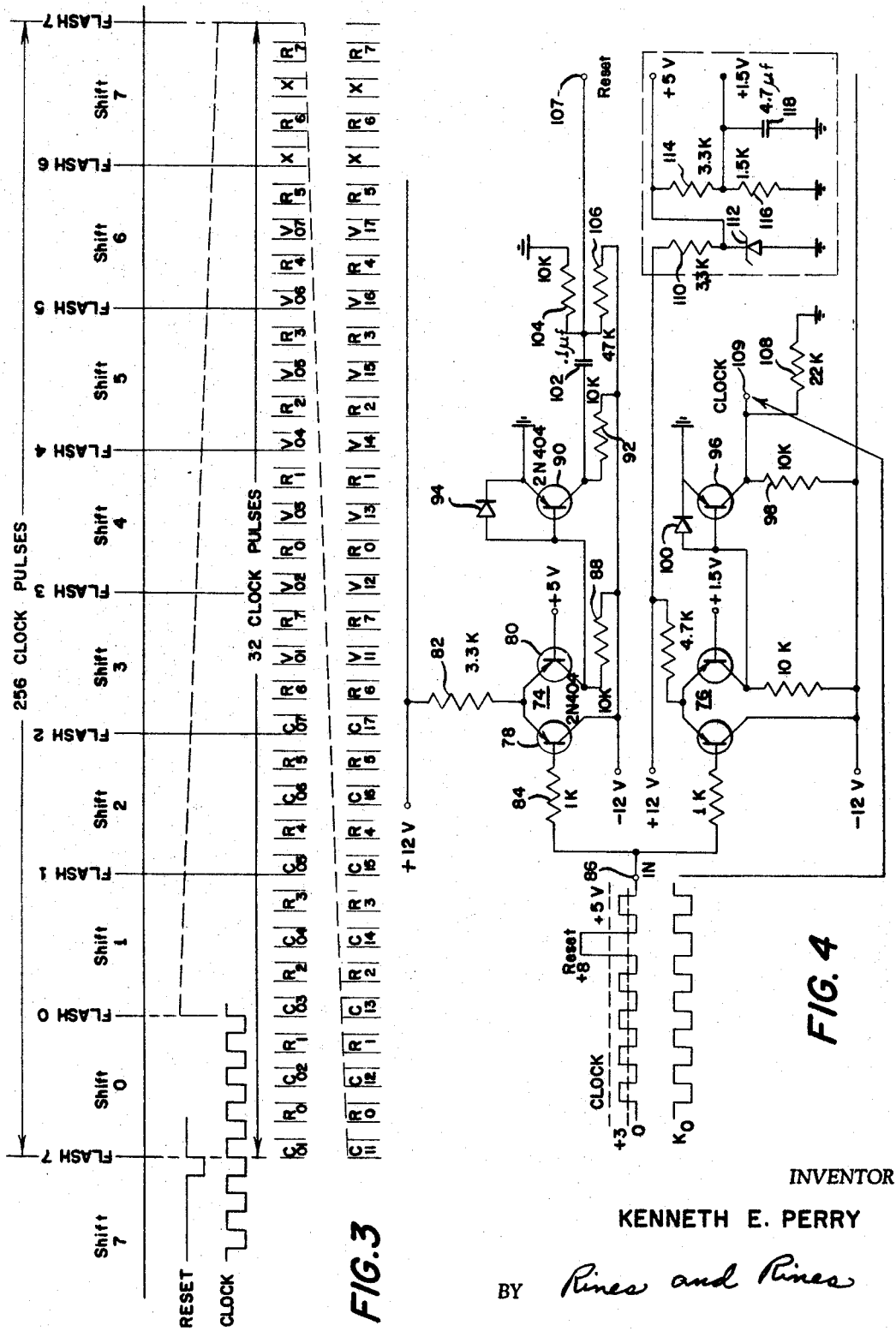

INVENTOR
KENNETH E. PERRY

July 9, 1968 K. E. PERRY 3,392,378
UNDERWATER TELEMETERING APPARATUS AND THE LIKE ADAPTED FOR USE
WITH A PLURALITY OF MEASURING STATIONS
Filed Oct. 26, 1964 5 Sheets-Sheet 5

INVENTOR
KENNETH E. PERRY

BY *Rines and Rines*

ATTORNEYS

United States Patent Office 3,392,378
Patented July 9, 1968

3,392,378
UNDERWATER TELEMETERING APPARATUS AND THE LIKE ADAPTED FOR USE WITH A PLURALITY OF MEASURING STATIONS
Kenneth E. Perry, Wayland, Mass., assignor, by mesne assignments, to EG&G International, Inc., Bedford, Mass., a corporation of Delaware
Filed Oct. 26, 1964, Ser. No. 406,337
8 Claims. (Cl. 340—204)

ABSTRACT OF THE DISCLOSURE

The present application discloses apparatus for enabling multiple measuring stations to be connected to the same data signal propagating medium, such as an underwater cable, and independently received control signals and transmit data signals without interference with the aid of multiplicity of shift registers each having control means for shifting the associated register and producing sequential output pulses therefrom, the control means being operative only when multiple stages of a multiple stage digital counter means indicates a predetermined counting state unique for each of said stations.

---

This invention relates to telemetering apparatus, and more particulaly to multiple-station apparatus for telemetering data representative of water current and related parameters.

It has heretofore been proposed to measure the direction and speed of water currents by suspending a water current meter from a buoy. The meter may have a magnetic compass to establish a reference direction, a vane to establish flow direction and a rotor for determining the speed of the current. Data from the meter may be transmitted by cable or radio, for example, to remote receiving and indicating apparatus.

It is a principal object of the present invention to provide apparatus in which a plurality of water current meters or the like, for example eight instruments, may be connected to the same data signal propagating medium, such as a cable, and may receive control signals and transmit data signals without interference.

Another object of the present invention is to provide such multiple-station telemetering apparatus which avoids the complexities and other disadvantages of comparable apparatus employed heretofore and which operates in accordance with a predetermined time program, so that control signals from a central station and data signals from the respective meter stations are interlaced upon the same propagating medium.

More specifically it is an object of the present invention to provide apparatus of the foregoing type in which instrument bearing and current direction data, for example, are interlaced with current speed data and with control pulses.

A further object of the invention is to provide apparatus of the foregoing type which is capable of handling both synchronous and asynchronous data.

Yet another object of the invention is to provide apparatus of the foregoing type in which the current meter stations are responsive to a master source of clock and reset pulses which control the sequential transmission of data and may also energize and de-energize the apparatus at the meter stations in order to reduce drain upon the power supply.

A still further object of the invention is to provide apparatus of the foregoing type in which the number of current meter stations may be readily increased and in which the time sequential program may be readily varied.

An additional object of the invention is to provide apparatus of the foregoing type which employs readily available components and which may be completely solid-state, electronic modules being used for economy, low current drain, high reliability, circuit flexibility, and small size.

Briefly stated, and without intent to limit the scope of the invention, the apparatus of the invention may comprise a plurality of current meters connected to a cable for transmitting control signals to the meters from a central station and for transmitting water current and related data from the meters to the centeral station or elsewhere. Each meter may have a compass for determining the bearing of the meter, a vane for determining the direction of the fluid current at the meter with respect to the bearing, and a rotor for determining the speed of the current. A shift register is provided for receiving the compass and vane data, which are digitally encoded and applied to the register photoelectrically. Asynchronous rotor data are converted to synchronous data to be interlaced with outputs pulses from the shift register and with clock and reset pulses from the central station. A cable driver applies data pulses to the cable which are opposite in polarity to the clock and reset pulses. A multiple-stage digital control counter responsive to the clock and reset pulses controls the reading of data into and out of the shift register and the application of such data and the rotor data to the cable driver. Control circuits responsive to preselected counting conditions of certain stages of the counter ensure that the operation of each meter is timed to avoid interference of its data pulses with the data pulses of other meters or with the clock and reset pulses.

The foregoing and other objects, advantages, and features of the invention and the manner in which the same are accomplished will become more readily apparent upon consideration of the following detailed description of the invention taken in conjunction with the accompanying drawings, which illustrate preferred and exemplary embodiments, and wherein:

FIGURE 3 is a diagram illustrating the time sequential operation of the system of the invention;

FIGURE 4 is a schematic diagram of a clock and reset pulse generator circuit which may be employed in the system of the invention;

Figure 1:
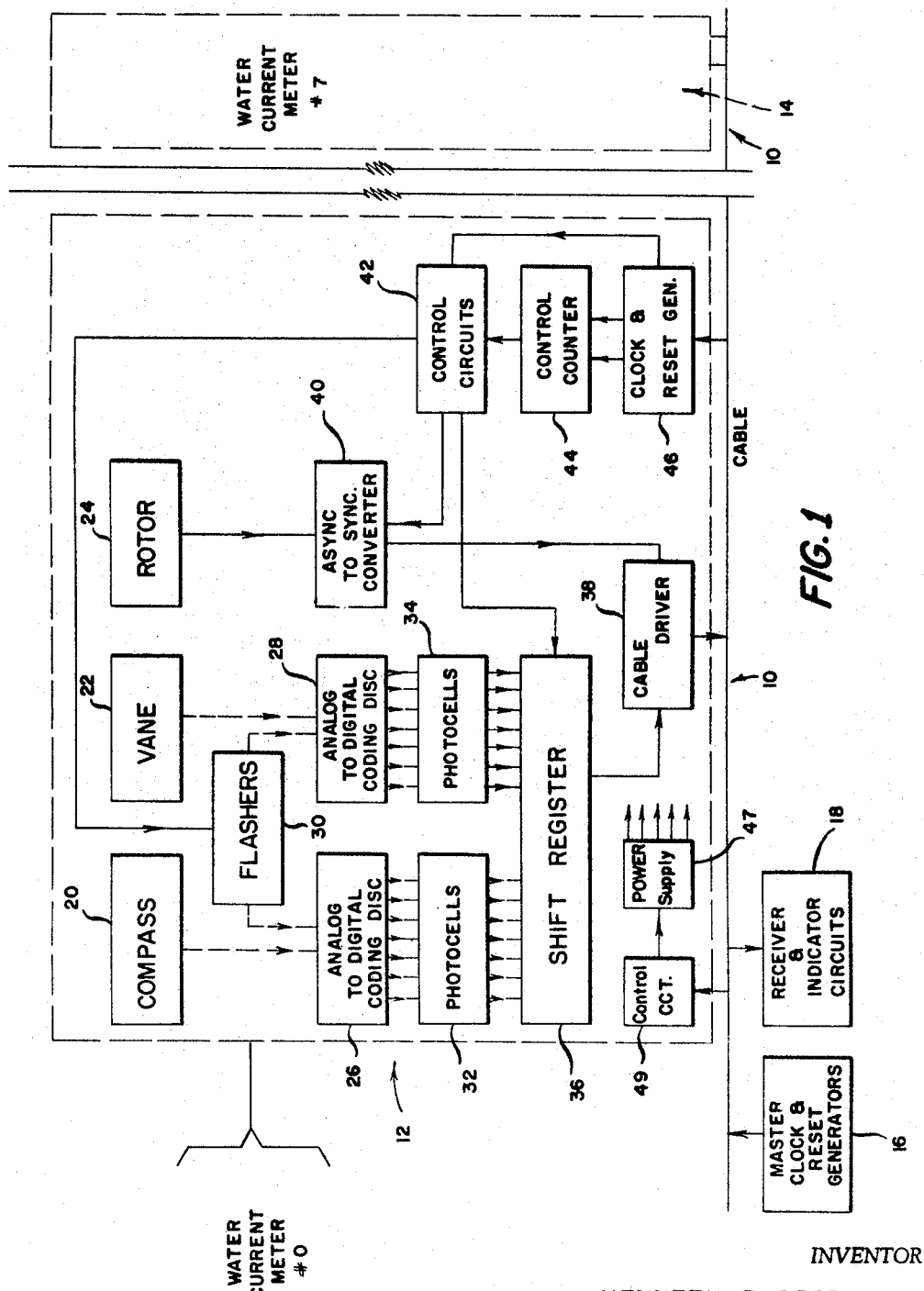
FIGURE 1 is a block diagram of the telemetering system in accordance with the invention.

Referring to the drawings, and initially to FIGURE 1 thereof, reference numeral 10 designates a cable to which a plurality of water current meters are connected, there being eight meters in a representative embodiment but only meter #0 designated by reference numeral 12 and meter #7 designated by reference numeral 14 being shown. It will be understood that a lesser or greater number of meters may be employed. For example, the system may easily be expanded to accommodate sixteen or more meters. The cable may comprise a single conductor and utilize sea return or may have two or three conductors, for example.

Master clock and reset generators 16 apply clock and reset pulses to the cable. Receiver and indicator circuits 18 receive and indicate data pulses obtained from the meters. The apparatus in blocks 16 and 18 may be located at the same remote station or may be separately located. The water current meters are provided with conventional housings and may be suspended from buoys, for example. The cable may extend from the buoys to a land-based station or may be connected to a telemetering transmitter for relaying the data to a remote station by radio or other suitable media.

The water current meter shown in block 12 is representative of the other meters in the system; a description of one meter will suffice for all. Blocks 20, 22 and 24 represent conventional sensors of the data to be transmitted from the current meter. Block 20 may be a conventional magnetic compass for determining the bearing of the meter. Block 22 may be a vane which is free to align itself with the direction of the water current at the meter. Block 24 may be a rotor or impeller driven by the water current and producing pulses at a repetition rate corresponding to the speed of the current.

The motive elements of the compass and vane sensors position conventional analog to digital coding discs 26 and 28. The coding discs are utilized in conjunction with flashers 30 and photocells 32 and 34 for converting the analog data from the compass and vane sensors to digital data and for reading such data into a shift register 36. The output of the shift register is connected to a cable driver 38, which supplies data pulses to the cable 10 for transmission to the receiver and indicator circuits 18. Asynchronous data from the rotor sensor 24 are fed to asynchronous to synchronous converter 40, which also is connected to the cable driver 38.

The flashers, shift register, and asynchronous to synchronous converter are operated in accordance with a timed program by control circuits 42. The timed operation of the control circuits is obtained by means of a control counter 44 supplied with reformed clock and reset pulses from the generators 46, reformed clock pulses also being supplied directly to certain control circuits. The control circuits are connected for operation in response to predetermined counting conditions in certain stages of the control counter, the selection being made in each meter to avoid interference with the operation of the companion water meters. Pulses from the cable driver are interlaced with the control pulses from the clock and reset generators 16 and with the data pulses from the companion water meters. Moreover, the data pulses are made opposite in polarity to the clock and reset pulses to facilitate their selection by the proper circuits. In a typical operating cycle there are 256 clock pulses. The first clock pulse occurs simultaneously with a reset pulse, and there are then 255 clock pulses before the occurrence of the next reset pulse and simultaneous clock pulse. As will be seen hereinafter, during the interval between reset pulses all eight current meters report their vane and compass readings as well as any rotor data occuring in the interval. With a clock pulse rate of 100 p.p.s., the cycle time is 2.5 seconds.

A power supply 47 for the meter circuits is controlled by circuit 49 to provide electric power only when clock pulses are present on the cable. The output of the power supply is typically +12 volts and —12 volts and 75 ma. when the meter is operating.

Figure 2:
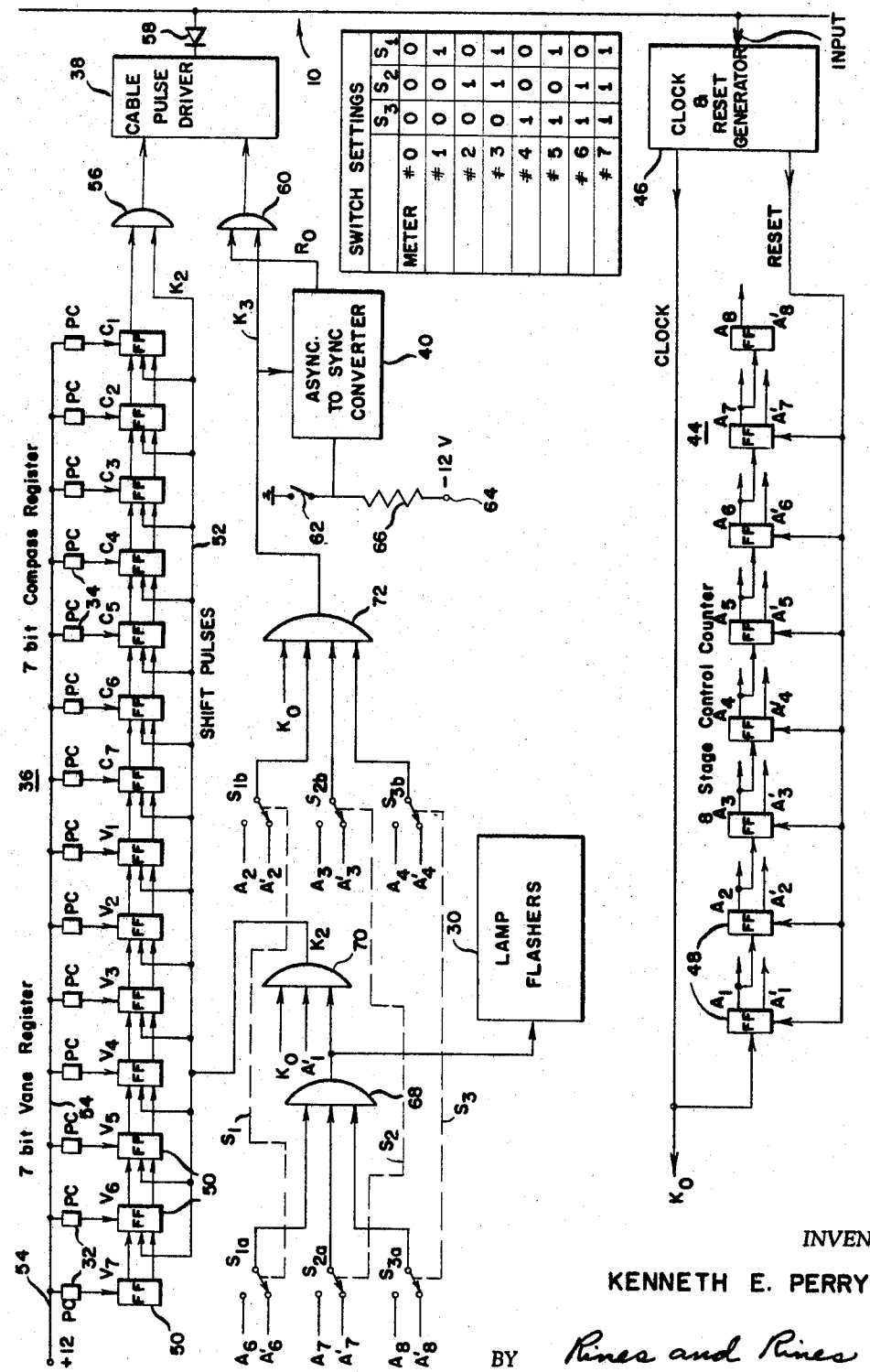
FIGURE 2 is a more detailed block diagram of certain portions of a typical current meter station of the invention.

FIGURE 2 is a block diagram illustrating certain portions of a representative water current meter in greater detail. The control counter 44 comprises eight flip-flop stages 48 connected to form a conventional 8-stage binary counter. Reformed clock pulses $K_0$ are applied to the set input of the first stage and are counted by the counter in the usual manner. Reformed reset pulses applied to the reset inputs of the flip-flops reset all eight stages simultaneously. Each flip-flop stage of the control counter has a pair of outputs, such as $A_1$ and $A_1'$, which assume "ON" or "OFF" states alternately in accordance with the count attained by the counter. As will be seen hereinafter, predetermined counting conditions of certain stages are utilized to control the time sequential operation of the data handling circuits of the invention.

Shift register 36 comprises fourteen flip-flop stages 50, seven of which ($V_1$–$V_7$) are employed for vane registration and seven ($C_1$–$C_7$) for compass registration. As is well known, each stage transfers its stored data to the next stage upon the application of a shift pulse to conductor 52, successive shift pulses causing successive transfer of data from stage to stage, the data being read out sequentially from the first stage $C_1$.

The photo-conductive cells 32 and 34 control the reading of information into the respective stages of the shift register. Each cell is connected between the +12 volt bus 54 and the read-in terminal of the corresponding flip-flop (e.g., the base of a flip-flop transistor). Each photocell may be connected by a conventional light pipe to a predetermined digital place on a coding disc. By conventional techniques the discs are positioned by the compass and vane sensors so as to block or pass light to the respective light pipes from flashers 30 in accordance with a binary code, there being seven bits for the vane and seven bits for the compass.

When flashers 30 are energized, light will fall upon the photocells which are not blocked by the coding discs, and the resistance of the cells will drop from many megohms to a few kilohms during the flash, which may have a 50 millisecond duration, for example. Thus each flip-flop stage corresponding to an exposed photocell will be set to a "one" state. A few tenths of a second are necessary for the photocells to recover their high resistance, and the shifting of stored data must be delayed accordingly. As will be seen hereinafter, this is accomplished by energizing the lamp flashers just after all stored data are shifted out of the register. With the assumed 256 clock pulses for a complete cycle and a clock rate of 100 p.p.s., there will be more than two seconds allowed for recovery of the photocells.

The cable pulse driver 38 is connected to the output of an AND gate 56 having one input from the first stage of the shift register and another input from the shift pulse bus 52. As will be seen hereinafter, negative output pulses are passed by a rectifier 58 to the cable and are interlaced with positive clock and reset pulses on the cable.

The cable pulse driver is also fed by another AND gate 60, one input of which is supplied with pulses $K_3$ constituted in a manner to be described, and the other input of which is supplied with pulses from the asynchronous to synchronous converter 40. The input of the converter is controlled by a rotor switch 62, which may complete a circuit from the —12 volt bus 64 to ground (earth or chassis) through a resistor 66. Thus the input changes from —12 volts to ground voltage when the rotor switch is closed. The rotor switch is operated by a rotor or impeller which turns at a rate proportional to the water current speed. The rotor pulses occur asynchronously and are converted to synchronous pulses by converter 40 so as to permit interlacing with the other data and control pulses. AND gates 56 and 60 and additional AND gates 68, 70 and 72 constitute the control circuits 42 of FIGURE 1.

A set of three DPDT toggle switches $S_1$, $S_2$, $S_3$ selects the outputs of the control counter 44 which determine the timed operation of each current meter. Each switch has two sections, those of the first switch being designated $S_{1a}$ and $S_{1b}$, the second being designated $S_{2a}$ and $S_{2b}$, and the third being designated $S_{3a}$ and $S_{3b}$. The $a$ and $b$ sections of each switch are ganged as shown. The $a$ sections are capable of selecting one or the other of the outputs of the 6th, 7th and 8th stages of the control counter, while the $b$ sections are capable of selecting one or the other of the outputs of the 2nd, 3rd, and 4th stages of the control counter. Each current meter has a different pattern of switch settings, typical patterns being shown in the switch setting chart of FIGURE 2, the switches illustrated being in their zero positions. The timed operation of the control circuits will be described later.

FIGURE 4 illustrates a clock and reset generator circuit 46 for reforming the clock and reset pulses transmitted on the cable. As shown, the master clock pulses may be positive pulses which rise from zero to +3 volts, and the reset pulses may be positive pulses which rise from zero to +8 volts. Rise and fall time is 100 microseconds, for example, and clock pulse duty cycle 50%. The reset generator comprises a threshold circuit 74, while the clock generator comprises a threshold circuit 76. Threshold circuit 74 comprises a pair of PNP transistors 78 and 80 having their emitters connected to the +12 volt bus through a common resistor 82. The base of transistor 78 is connected through a resistor 84 to the input terminal 86 from the cable. The collector of transistor 78 is connected to the negative 12 volt bus. The base of transistor 80 is connected to a positive 5 volt source and its collector is connected through a resistor 88 to the negative 12 volt bus. Threshold circuit 76 is similar except for the values, the voltage at the base of the second stage of circuit 76 being positive 1.5 volts.

The collector of transistor 80 is connected to the base of another PNP transistor 90 having its emitter connected to ground and its collector connected through a resistor 92 to the negative 12 volt bus. A diode 94 is connected between the base and emitter to limit the back bias which may be applied. In the clock generator transistor 96, resistor 98 and diode 100 are similarly connected. The collector of transistor 90 is connected through a condenser 102 to the junction of a pair of resistors 104 and 106, which form a voltage divider between the negative 12 volt bus and ground. The output terminal 107 for the reset pulses is connected to this junction. In the clock generator the collector of transistor 96 is connected to ground through a resistor 108 and also to an output terminal 109 for the clock pulses.

The positive 5 volt and 1.5 volt potentials may be obtained from a bias circuit comprising a resistor 110 connected in series with a Zener diode 112 from the positive 12 volt bus to ground. The junction of these components provides the positive 5 volt bias. A pair of resistors 114 and 116 connected from this junction to ground forms a voltage divider from which the positive 1.5 volt bias is obtained across a condenser 118.

Transistor 78 of threshold circuit 74 is normally conducting, and transistor 80 is normally non-conducting. The corresponding transistors of threshold circuit 76 are similarly conducting and non-conducting. The amplitude of the clock pulses is capable of reversing the conductivity states of the transistors of circuit 76 but incapable of reversing the conductivity states of the transistors of circuit 74. The reset pulses have sufficient amplitude to reverse the states of both circuits.

The operation of the reset circuit is typical. When transistor 80 conducts, the potential applied to the base of transistor 90 becomes more positive, cutting off this normally conductive transistor, the back bias being limited by diode 94. The potential at the collector of transistor 90 thus becomes more negative, providing a negative reset pulse at terminal 107 corresponding to a master reset pulse at terminal 86. Master clock pulses at terminal 86 produce negative clock pulse $K_0$ at the clock pulse output terminal 109.

Figure 5:
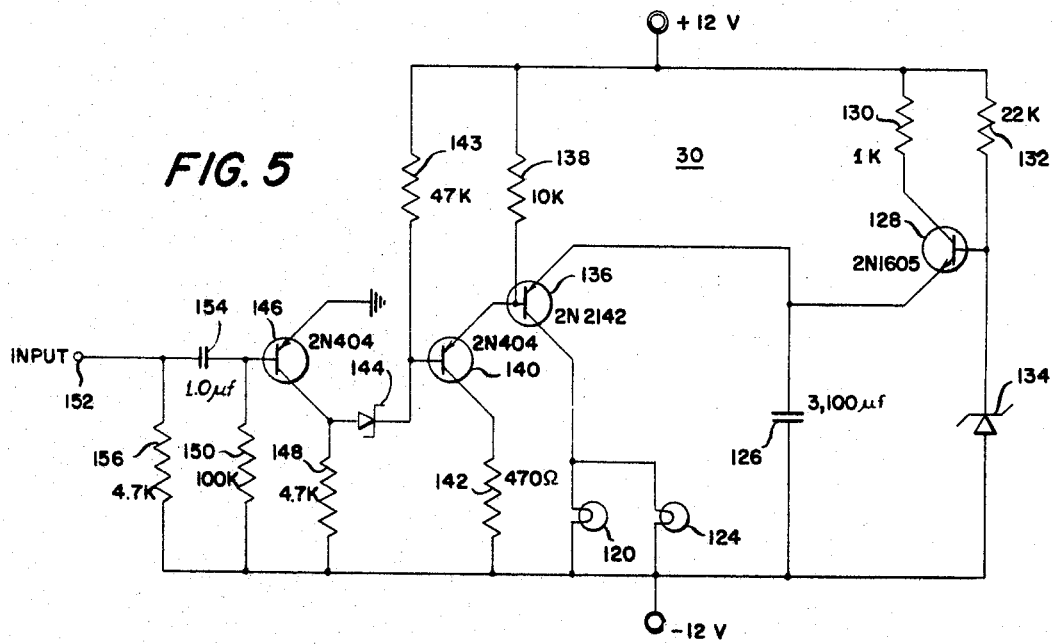
FIGURE 5 is a schematic diagram of a flasher circuit which may be employed in the system of the invention.

FIGURE 5 illustrates lamp flasher circuit 30. The vane and compass flasher lamps are shown at 120 and 124, respectively. Condenser 126 charges through an NPN transistor 128 and resistor 130 from the positive 12 volt bus, one plate of the condenser being connected to the emitter of transistor 128, and the other to the negative 12 volt bus. Resistor 132 and Zener diode 134 connected in series across the busses provide at their junction a regulated potential for the base of transistor 128, which may be ground potential, for example. Condenser 126 charges until the potential at the emitter of transistor 128 reaches the potential at the base.

The condenser is discharged through the lamps by means of a PNP transistor 136, which has its base connected through resistor 138 to the +12 volt bus and which is non-conducting until triggered. The base of transistor 136 is connected to the emitter of a PNP transistor 140, the collector of which is connected through resistor 142 to the negative 12 volt bus and the base of which is connected through a resistor 143 to the positive 12 volt bus and through a Zener diode 144 to the collector of a PNP transistor 146. Transistor 146 has its emitter grounded and its collector connected through a resistor 148 to the negative 12 volt bus. The base of transistor 146 is connected through resistor 150 to this bus. Transistor 140 is normally non-conducting and transistor 146 is normally conducting. An input terminal 152 (from the output of AND gate 68 of FIGURE 2) is connected through a condenser 154 to the base of transistor 146 and through a resistor 156 to the negative 12 volt bus.

During the time that data are being read out of the current meter the potential on terminal 152 is negative. At the end of this interval the potential rises to ground, cutting off transistor 146. The potential at the collector of transistor 146 becomes sufficiently negative to exceed the back bias break-down voltage of the Zener diode 144, making the base of transistor 140 more negative and rendering this transistor conductive. The potential at the emitter of transistor 140 becomes more negative, causing transistor 136 to conduct and to discharge condenser 126 through the vane and compass lamps, thereby producing a flash of light. The positive rise passed by condenser 154 from the input terminal 152 is transitory, and transistor 136 remains conductive only long enough for the discharge of condenser 126. Then condenser 136 cuts off again and transistor 128 conducts to recharge the condenser. The time constants of the charging circuit determine the recharging time.

Figure 6:
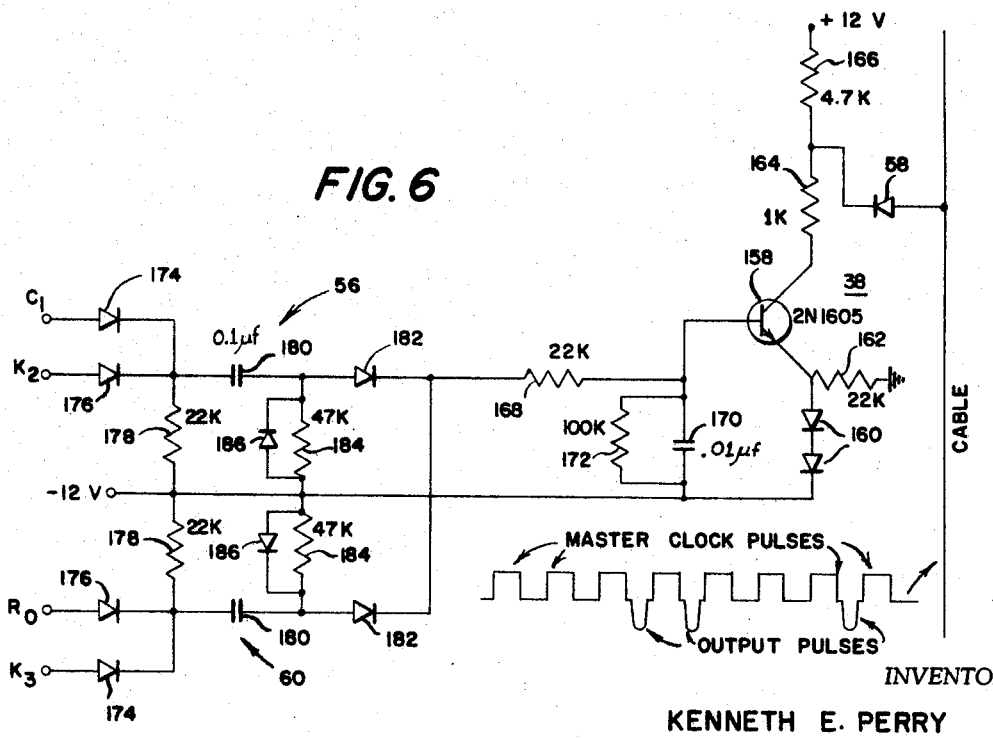
FIGURE 6 is a schematic diagram of a cable driver circuit which may be employed in the system of the invention.

The cable pulse driver 38 is shown in FIGURE 6, AND gates 56 and 60 also being shown. The driver comprises an NPN transistor 158, the emitter of which is connected through stabilizing diodes 160 to the negative 12 volt bus and through a resistor 162 to ground. The collector is connected through resistors 164 and 166 to the +12 volt bus, the junction of the resistors being connected through the diode 58 to the cable. The base of transistor 158 is connected to the AND gates by a network comprising a series resistor 168 and a shunt condenser 170 bridged by a resistor 172.

Each AND gate comprises a pair of diodes 174 and 176 connected from input terminals to a resistor 178 in turn connected to the negative 12 volt bus. The junction of the diodes and the resistor is connected through a condenser 180 and a diode 182 to resistor 168, the junction of the condenser and diode 182 being connected by a resistor 184 to the negative 12 volt bus. Resistor 184 is bridged by a diode 186. Concurrent negative pulses are applied to the inputs of either AND gate to initiate a data pulse. Upon the cessation of these negative input pulses the corresponding diodes 174 and 176 conduct, thereby passing a positive pulse through associated condenser 180 of sufficient magnitude to pass the associated diode 182 and render transistor 158 conductive for an interval determined by the parameters of the RC network at the base of the transistor. When the transistor conducts, a negative pulse is passed by diode 58 to the cable. As shown by the waveform the production of the negative output pulses after input pulses corresponding to the positive master clock pulses ensures that the output pulses are interlaced between the master clock pulses on the cable.

Figure 7A:
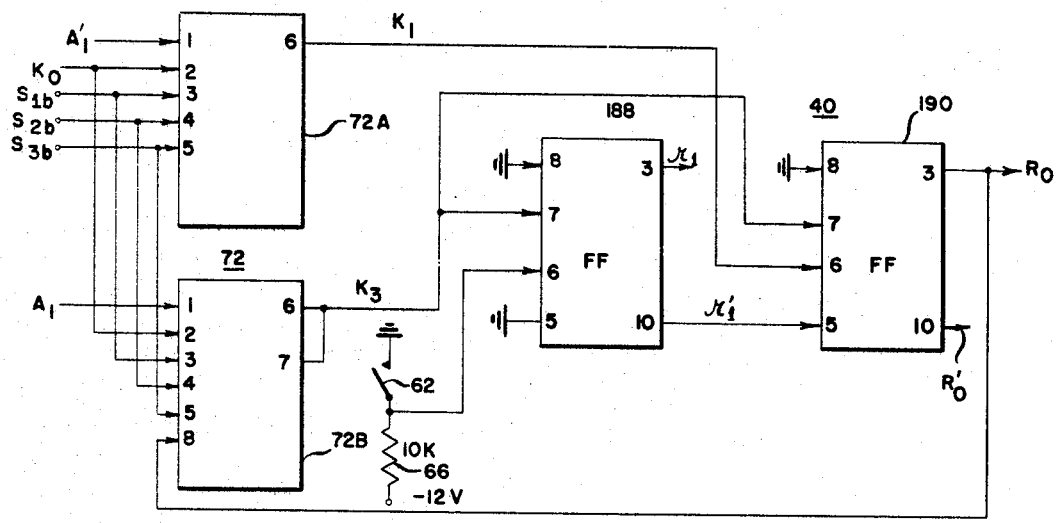
FIGURE 7A is a block diagram of an asynchronous to synchronous converter which may be employed to transform rotor data in the system of the invention.

FIGURE 7A illustrates the asynchronous to synchronous converter 40 and the AND gate 72. The converter comprises a pair of flip-flop circuits 188 and 190. The AND gate comprises a pair of coincidence circuits 72A and 72B. Input 1 of circuit 72A is connected to the $A'_1$ output of the control counter, while input 1 of circut 72B is connected to output $A_1$ of the control counter. Input 2 of each circuit is connected to the clock pulse bus from clock pulse generator 46, and inputs 3, 4 and 5 are connected to the $b$ sections of the switches $S_1$, $S_2$ and $S_3$.

Figure 7B:
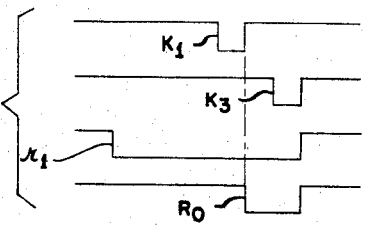
FIGURE 7B is a waveform diagram illustrating the operation of the converter.

Each time the rotor switch 62 closes a pulse is stored in flip-flop 188, producing a negative potential at terminal 3 of flip-flop 188 represented by pulse $r_1$ in FIGURE 7B. During the rotor read out interval for the meter, characterized by the presence of negative potentials at the $b$ sections of the switches, circuit 72A provides a negative output pulse $K_1$ each time a negative pulse is applied from the $A'_1$ output of control counter. This occurs every other clock pulse. Pulse $K_1$ is applied to terminal 6 of flip-flop 190 to shift any stored data from terminal 10 of flip-flop 188 to terminal 5 of flip-flop 190. At the termination of pulse $K_1$, an output pulse $R_0$ is present at terminal 3 of flip-flop 190 and is also fed back to the input 8 of circuit 72B. Upon the occurrence of a negative pulse from the $A_1$ output of the counter, circuit 72B produces an output pulse $K_3$ which resets flip-flops 188 and 190, terminating pulse $r_1$ and pulse $R_0$ and removing the negative potential at terminal 8 of circuit 72B.

Figure 8:
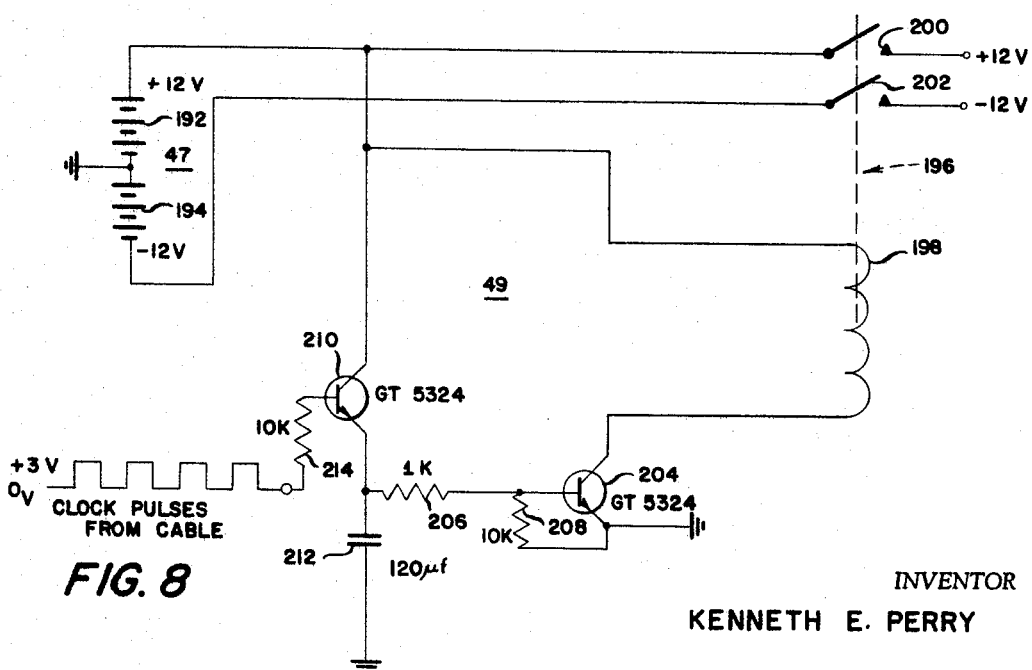
FIGURE 8 is a schematic diagram of a power supply and control circuit which may be employed in the system of the invention.

FIGURE 8 illustrates the 12 volt power supply 47 and the control circuit 49. The positive and negative 12 volt potentials on the respective busses are obtained from a pair of batteries 192 and 194, opposite terminals of which are grounded and connected to the busses respectively. A relay 196 has a coil 198 for controlling a pair of switches 200 and 202 for closing the circuit from the power supply to the busses. Relay 196 is energized from the positive supply to close the switches when an NPN transistor 204 is rendered conductive. The collector of the transistor is connected through the relay coil 198 to the positive supply, and the emitter is connected to ground. The base is connected to the junction of a pair of resistors 206 and 208 connected between the emitter of an NPN transistor 210 and ground. The collector of transistor 210 is also connected to the positive supply, and the emitter is connected to ground through a condenser 212. The base of transistor 210 is connected through a resistor 214 to the cable, from which the positive master clock pulses are applied.

When clock pulses are present, transistor 210 is rendered conducting repetitively, charging condenser 212 to render transistor 204 conducting in order to energize the relay and close switches 200 and 202. When the clock pulses are absent for a period of time sufficient to permit condenser 212 to discharge through resistors 206 and 208, transistor 204 cuts off, de-energizing the relay and opening the line switches.

A typical cycle of operation of the system is illustrated in the diagram of FIGURE 3. The total cycle comprises 256 clock pulses, the first and last being concurrent with a reset pulse. With eight meters there are thirty-two clock pulses for the data read out interval for each of the meters. The first read out interval is designated "shift zero" and indicates the data read out interval for meter #0. In the illustrated expansion of the shift zero and shift 1 intervals the positions designated C, R and V correspond to the positions available for data pulses for compass, rotor and vane readings, respectively. The X's designate unused positions. The first digit of the subscript for the C and V positions designates the meter, and the second digit designates the information bit, there being seven bits for the compass and seven for the vane. The readings in binary code are represented by the pattern of pulses present or absent at the seven positions in the pulse train. Rotor pulses, if any, are interlaced with the compass and vane pulses, the subscript of the R position designating the meter. The number of rotor pulses per unit time represents current speed. The compass and vane pulses are transmitted only during the interval for the corresponding meter, but rotor pulses for all meters may be transmitted twice during the shift interval for each meter. The time between opportunities to transmit a rotor pulse must be less than the minimum interval between rotor pulses in any meter. With the assumed clock rate of 100 p.p.s., this time is a little less than ⅙ second, sufficient for current speeds of nearly five knots. At the end of each shift interval the corresponding lamp flashers are energized to read new data into the shift register from which data has just been read out.

From FIGURE 2 it can be seen that the AND gate 68 of each meter is open for particular conditions of the last three stages of the eight-stage control counter, the conditions being different for each meter. Thirty-two clock pulses must be counted in the first five stages of the control counter in order to change a condition in the last three stages and to close the gate 68. When the gates closes, the lamp flashers 30 for that meter are energized. During the time that gate 68 is open gate 70 produces shift pulses $K_2$ every time a pulse is supplied from the output $A'_1$ of the counter, in other words on every other clock pulse. A data pulse may thus be read from the first stage of the shift register 36 on every other clock pulse. Between these data pulses rotor pulses may be applied to the cable. Since AND gate 72 is opened during predetermined conditions of the second, third and fourth stages of the control counter, the AND gate can only be opened once for exery sixteen clock pulses ($2^4$). Thus with thirty-two clock pulses per interval, the AND gate is opened twice. Since the selector switches at the inputs of the AND gate are in different positions for the different meters, only one AND gate 72 can be opened at a time. Moreover, AND gate 60 produces an output pulse in response to a pulse $K_3$ from AND gate 72. Pulses $K_3$ are produced in response to pulses from output $A_1$ of the counter, thereby ensuring that the rotor pulses are interlaced with the pulses from the shift register, which are produced in response to pulses from output $A'_1$ of the counter. There is no possibility of interference between the data pulses from any of the meters and the control pulses from the master clock and reset generators.

While preferred embodiments of the invention have been shown and described, it will be apparent to those skilled in the art that changes can be made in these embodiments without departing from the principles and spirit of the invention, the scope of which is defined in the appended claims. The specific circuits and circuit values shown are representative. Accordingly, the foregoing embodiments are to be considered illustrative, rather than restrictive of the invention, and those modifications which come within the meaning and range of equivalency of the claims are to be included therein.

The invention claimed is:

1. Underwater telemetering apparatus and the like, having, in combination, a plurality of measuring stations, each of said stations having a shift register and means for reading a digital code into said register representative of a parameter to be measured, means for generating a train of control pulses, mutliple-stage digital counter means for counting in response to said control pulses, control means for each of said shift registers responsive to a series of said control pulses for shifting the associated register and producing sequential output pulses therefrom corresponding to said code, and means for rendering said control means operative only when multiple stages of said counter means have a predetermined counting state which is unique for each of said stations.

2. The apparatus of claim 1, further comprising means for interlacing the output pulses of said shift registers between said control pulses.

3. The apparatus of claim 2, the last-mentioned means comprising means for producing data pulses which are opposite in polarity to said control pulses.

4. The apparatus of claim 1, further comprising means for producing pulses having a repetition rate corresponding to water current speed at each of said stations, and means for interlacing the last-mentioned pulses with the output pulses of said shift registers and with said control pulses.

5. The apparatus of claim 4, the last-mentioned means comprising an asynchronous to synchronous converter.

6. Underwater telemetering apparatus and the like having, in combination, a cable, a plurality of measuring stations adapted to receive signals from and to apply signals to said cable, each of said stations having means for producing digital outputs corresponding to the bearing of the station, and the direction and speed of water current at the station, each of said stations having multiple-stage digital counter means, clock and reset pulse generator means connected to said cable for applying to said counter means repetitive spaced reset pulses with a plurality of clock pulses between successive reset pulses, each of said stations having control means responsive to said counter means for applying said digital outputs to said cable only when certain stages of said counter means are in predetermined counting state, said counting state being different for the respective stations whereby the outputs from said stations are applied to said cable at different times.

7. Telemetering apparatus and the like having, in combination, a plurality of measuring stations, each of said stations having a shift register and means for reading the elements of a digital code into said shift register in parallel in accordance with a parameter to be measured, counter means, means for generating a train of control pulses to be counted by said counter means, and control circuit means responsive to a series of said control pulses for causing the shift registers associated with the repective stations to produce trains of output pulses during different counting states of said counter means corresponding to different portions of said train of control pulses.

8. The combination of claim 7, said train of control pulses having consecutive portions corresponding to consecutive shift intervals for the shift registers of said stations, said control circuit means comprising means for reading each digital code into its shift register immediately after the corresponding shift interval.

References Cited

UNITED STATES PATENTS

| | | | |
|---|---|---|---|
| 2,946,044 | 7/1960 | Bolginano | 340—204 |
| 3,114,900 | 12/1963 | Anderson | 340—204 |
| 3,138,794 | 6/1964 | Blum | 340—204 |
| 3,175,154 | 3/1965 | Guenella | 340—204 |

THOMAS B. HABECKER, *Primary Examiner.*